US012548462B2

(12) United States Patent
Hau et al.

(10) Patent No.: US 12,548,462 B2
(45) Date of Patent: Feb. 10, 2026

(54) GENERATING VIRTUAL OBJECTS FOR A MIXED REALITY DISPLAY TO RENDER IN A FIELD OF VIEW OF A USER OPERATING A VEHICLE

(71) Applicant: INTERNATIONAL BUSINESS MACHINES CORPORATION, Armonk, NY (US)

(72) Inventors: Mak Hoi Victor Hau, Markham (CA); Shikhar Kwatra, San Jose, CA (US); Devon Deane, Toronto (CA); Xu Wang, Markham (CA); Minhua Zhu, Toronto (CA)

(73) Assignee: International Business Machines Corporation, Armonk, NY (US)

( * ) Notice: Subject to any disclaimer, the term of this patent is extended or adjusted under 35 U.S.C. 154(b) by 686 days.

(21) Appl. No.: 18/053,347

(22) Filed: Nov. 7, 2022

(65) Prior Publication Data

US 2024/0153399 A1 May 9, 2024

(51) Int. Cl.
*G09B 9/052* (2006.01)
*G06T 19/00* (2011.01)
(Continued)

(52) U.S. Cl.
CPC ............ *G09B 9/052* (2013.01); *G06T 19/006* (2013.01); *G06V 10/764* (2022.01);
(Continued)

(58) Field of Classification Search
CPC .... G09B 9/052; G06T 19/006; G06V 10/764; G06V 10/774; G06V 10/82; G06V 20/20; G06V 20/56
(Continued)

(56) References Cited

U.S. PATENT DOCUMENTS 9,064,420 B2 6/2015 Beckwith
9,251,715 B2 2/2016 Hing et al.
(Continued)

FOREIGN PATENT DOCUMENTS

CN 106671984 A 5/2017
CN 106448260 B 7/2019
(Continued)

OTHER PUBLICATIONS

George, et al., "DAARIA: Driver Assistance by Augmented Reality for IntelligentAutomobile", ResearchGate, IEEE Intelligent Vehicles Symposium, Sep. 2012, 27 pp.
(Continued)

*Primary Examiner* — Pierre E Elisca
(74) *Attorney, Agent, or Firm* — Konrad, Raynes, Davda & VIctor LLP; David Victor

(57) ABSTRACT

Provided are a computer program product, system, and method for generating virtual objects for a mixed reality display to render in a field of view of a user operating a vehicle. A view environment image of a user field of view of a user operating the vehicle is received. The view environment image and a user difficulty level for the user are inputted into a generator, comprising a neural network model, to generate an augmented environment image including virtual objects added to the view environment image. The virtual objects are transmitted to a mixed reality display to render in the field of view of the user.

20 Claims, 5 Drawing Sheets

(51) Int. Cl.
G06V 10/764 (2022.01)
G06V 10/774 (2022.01)
G06V 10/82 (2022.01)
G06V 20/20 (2022.01)
G06V 20/56 (2022.01)

(52) U.S. Cl.
CPC ............ G06V 10/774 (2022.01); G06V 10/82 (2022.01); G06V 20/20 (2022.01); G06V 20/56 (2022.01)

(58) Field of Classification Search
USPC .............................................................. 434/4
See application file for complete search history.

(56) References Cited

U.S. PATENT DOCUMENTS

| | | | |
|---|---|---|---|
| 10,127,820 B2 | 11/2018 | Park | |
| 10,275,959 B2 | 4/2019 | Ricci | |
| 11,934,572 B2 * | 3/2024 | Forutanpour | G06F 3/013 |
| 2006/0040239 A1 | 2/2006 | Cummins | |
| 2014/0267263 A1 | 9/2014 | Beckwith | |
| 2019/0362641 A1 * | 11/2019 | Sukhwani | G09B 5/12 |
| 2021/0276422 A1 | 9/2021 | Masoero | |
| 2023/0144091 A1 * | 5/2023 | Forutanpour | G06F 3/013 |
| | | | 345/156 |
| 2024/0168548 A1 * | 5/2024 | Forutanpour | G06F 3/013 |

FOREIGN PATENT DOCUMENTS

| | | | |
|---|---|---|---|
| EP | 3520354 B1 | 3/2021 | |
| JP | 6412321 B2 | 10/2018 | |
| KR | 102007009 B1 | 10/2019 | |

OTHER PUBLICATIONS

Wikipedia, "List of countries by traffic-related death rate", 12 pp., [online][retrieved Aug. 15, 2022] https://en.wikipedia.org/wiki/List_of_countries_by_traffic-related_death_rate.

Malawsk, "Driver Assistance System using Augmented Reality Headset" IEEE, 2018, 4 pp., [online][retrieeved Aug. 15, 2022] https://ieeexplore.ieee.org/stamp/stamp.jsp?tp=&arnumber=8441298.

"Using AI and AR to Enhance Personalized Driving Assistance" WIPRO, Jun. 2021, 7 pp., [online][retrieved Jul. 11, 2022] https://www.wipro.com/innovation/using-ai-and-ar-to-enhance-personalized-driving-assistance/.

Fade, "Using VR and Augmented Reality to Aid Driver Training", VR Vision Group, Feb. 2020, 5 pp., [online] [retrieved Oct. 10, 2022] https://vrvisiongroup.com/using-vr-and-augmented-reality-to-aid-driver-training/.

"Virtual reality helping to create safety for UPS drivers", UPS, May 6, 2021, 2 pp., [online][retrieved Oct. 10, 2022] https://about.ups.com/sg/en/social-impact/diversity-equity-and-inclusion/virtual-reality-helpi . . . .

"Background: What is a Generative Model?", Google, 22 pp., [online][retrieved Oct. 8, 2022] https://developers.google.com/machine-learning/gan/gan_structure.

S.R. Chowdry, et al., "Automated Augmentation with Reinforcement Learning and GANs for Robust Identification of Traffic Signs using Front Camera Images", arXiv:1911.06486v1, Nov. 15, 2019, 5 pp.

Bharath K, "Complete Guide to Generative Adversarial Networks (GANS)", PaperspaceBlog, 9 pp., [online][retrieved Oct. 8, 2022] https://blog.paperspace.com/complete-guide-to-gans/.

S. Dobilas, "cGAN: Conditional Generative Adversarial Network—How to Gain Control over GAN Outputs", Neural Networks, Aug. 2022, 26 pp., [online][retrieved Oct. 8, 2022] https://towardsdatascience.com/cgan-conditional-generative-adversarial . . . .

J. Johnson, et al., "Image Generation from Scene Graphs", Google, arXiv:1804.01622v1, Apr. 2, 2018, 16 pp.

M. Mirza, et al. "Conditional Generative Adversarial Nets", arXiv:1411.178v1, Nov. 6, 2014, 7 pp.

G. Mittal, et al., "Interactive Image Generation Using Scene Graphs", Published as a workshop paper at ICLR 2019, 10 pp.

S. Reed, et al., "Learning What and Where to Draw", 29th Conference on Neural Information Processing Systems (NIPS 2016), Barcelona, Spain, arXiv:1610.02454v1, Oct. 8. 2016, 9 pp.

T. Sylvain, et al., "Object-Centric Image Generation from Layouts", Association for the Advancement of Artificial Intelligence, The Thirty-Fifth AAAI Conference on Artificial Intelligence (AAAI-21), 2021, 9 pp.

M.O. Turkoglu, et al."A Layer-Based Sequential Framework for Scene Generation with GANS", Association for the Advancement of Artificial Intelligence, 2019, 9 pp.

T. McPhail, "Using New WebGL-powered Maps Features", Google Cloud, May 27, 2021, 7 pp., [online][retrieved Oct. 8, 2022] https://cloud.google.com/blog/products/maps-platform/using-new-webg . . . .

Groupe PSA, "Augmented reality & driving: enhancing the driving experience", https://www.youtube.com/watch?v=0OdZXf1E7Z8&t=59s, Jun. 11, 2015, 1 page.

* cited by examiner

GENERATING VIRTUAL OBJECTS FOR A MIXED REALITY DISPLAY TO RENDER IN A FIELD OF VIEW OF A USER OPERATING A VEHICLE

BACKGROUND OF THE INVENTION

1. Field of the Invention

The present invention relates to a computer program product, system, and method for generating virtual objects for a mixed reality display to render in a field of view of a user operating a vehicle.

2. Description of the Related Art

Mixed reality (MR) smart glasses are wearable computer-capable glasses that generate virtual objects, such as three-dimensional images, text, animations, and videos, to overlay into the wearer's field of vision to enable the wearer to view and interact with the virtual objects. Mixed reality is used to generate virtual objects in a user's field of view to enable the user to view and interact with the virtual objects. Mixed Reality (MR) merges the real world and the virtual world to create an immersive experience.

Mixed Reality is a combination of virtual reality and augmented reality. It creates a world in which more than one person can participate in an immersive environment and collaborate on a common task together. Mixed Reality glasses create visualizations where objects from both virtual world and real world interact with each other.

There is a need in the art to provide improved techniques for generating mixed reality virtual objects for a mixed reality display to render in a field of view of a user operating a vehicle.

SUMMARY

Provided are a computer program product, system, and method for generating virtual objects for a mixed reality display to render in a field of view of a user operating a vehicle. A view environment image of a user field of view of a user operating the vehicle is received. The view environment image and a user difficulty level for the user are inputted into a generator, comprising a neural network model, to generate an augmented environment image including virtual objects added to the view environment image. The virtual objects are transmitted to a mixed reality display to render in the field of view of the user.

DETAILED DESCRIPTION

People learning to operate a vehicle, e.g., car, boat, plan, may desire to operate the vehicle in a realistic traffic environment before going into a dangerous real-life situation. Further, student drivers often experience apprehension about a vehicle operating license test or their first driving lesson in real time traffic. This lack of experience in operating a vehicle often results in inexperienced drivers failing their vehicle operating test and accidents due to their lack of training in reacting to difficult traffic situations.

Described embodiments provide improvements to computer technology for simulating a vehicle operating environment by using a generator neural network to generate virtual objects representing additional obstacles in traffic to transmit to a mixed reality display worn by the user to render in a user field of view while the user is operating a vehicle. Rendering the additional virtual objects and virtual obstacles train the users to react to different types of obstacles and traffic challenges in a mixed real and simulated environment.

Further improvements to computer technology comprise determining a user difficulty level at which to generate the virtual objects that may be adjusted based on a user comfort level with the current operating environment and level of virtual objects rendered. The user comfort level may in turn be based on user performance in maneuvering the vehicle in the current level of rendered virtual objects and user sensed biometrics while operating the vehicle. Described embodiments provide further improvements to traffic simulation by implementing the generator that produces the virtual objects as part of a Generative Adversarial Network (GAN), where a discriminator neural network may classify the image and virtual objects produced by the generator as realistic or fake and use such classification to further train the generator neural network to add realistic traffic virtual objects to a driving view of the user.

Figure 1:
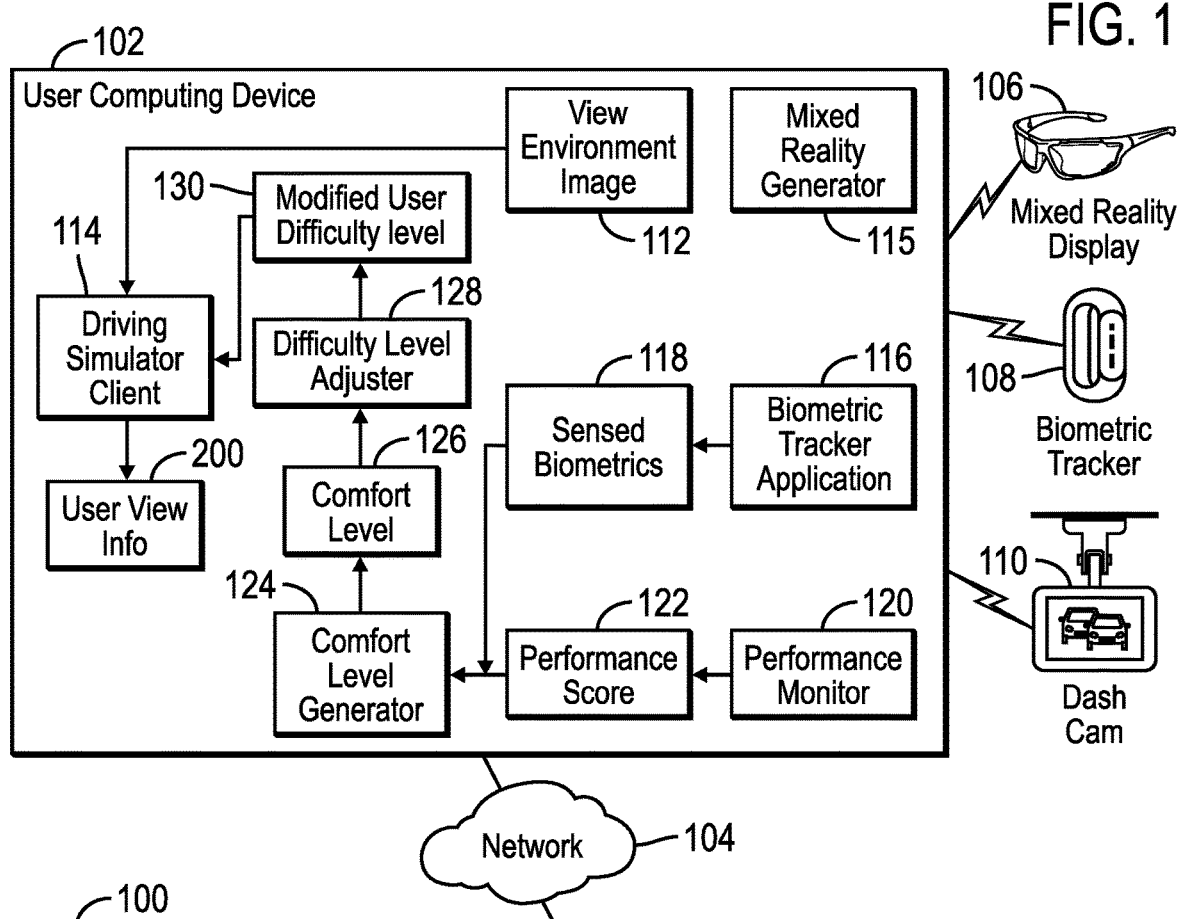
FIG. 1 illustrates an embodiment of a computing environment to generate virtual objects to send to a mixed reality display to render in a field of view operating a vehicle.
Figure 1:
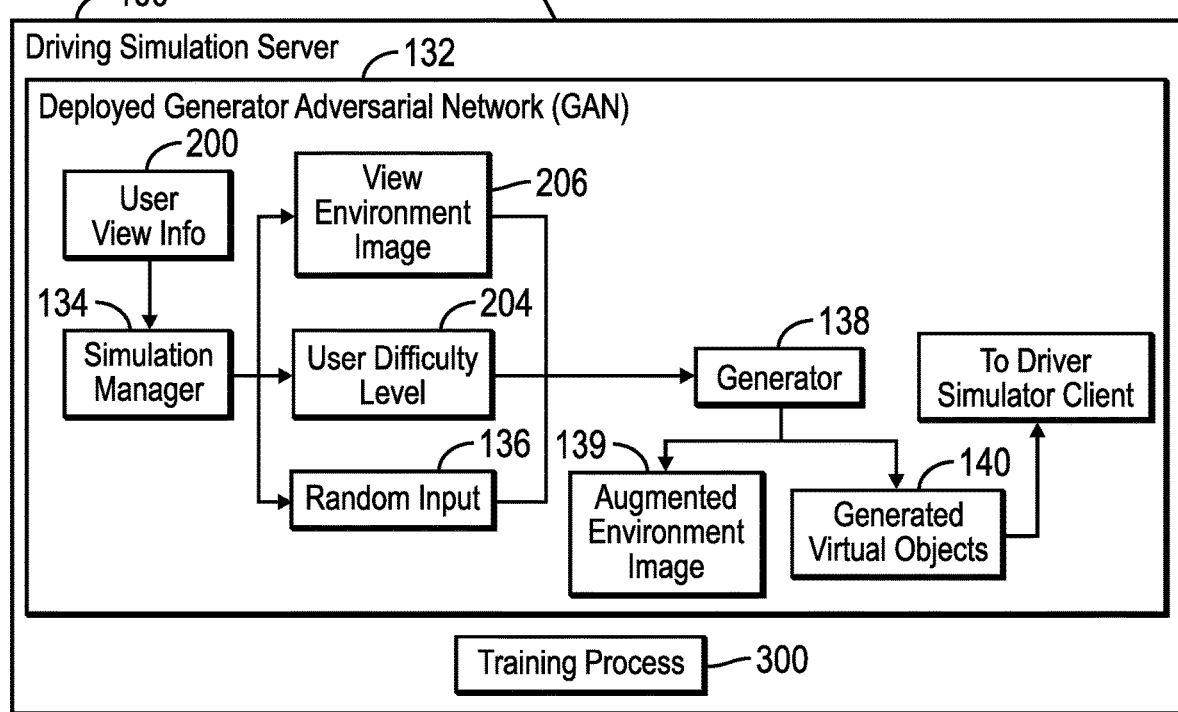

FIG. 1 illustrates an embodiment of a driving simulation server 100 in communication with a user computing device 102 over a network 104. The user computing device 102 is coupled to a mixed reality display 106, e.g., mixed reality glasses, gaze tracking device, etc., a biometric tracker 108 to gather biometric data from the user, and one or more dashboard recorders 110 attached to a vehicle the user is operating to capture real-time traffic as a view environment image 112. The user computing device 102 may communicate with the mixed reality display 106, the biometric tracker 108, and the one or more dashboard recorders 110 via wireless or wired communication methods. Alternatively, the user computing device 102 components may be implemented in the body of the mixed reality display 106. The user computing device 102 may include a driving simulator client 114 to communicate user view information 200 to the driving simulation server 100 for virtual objects to render in the mixed reality display 106.

The user computing device 102 includes a mixed realty generator 115 to generate mixed reality representations of virtual objects in a field of view the user is gazing through the mixed reality display 106; a biometric tracker application 116 to receive sensed data from the biometric tracker 108 and produce sensed data 118; a performance monitor 120 to monitor driver interaction with virtual objects rendered in the field of view to produce a performance score 122; a comfort level generator 124 to receive the sensed biometrics 118 and performance score 122 and generate a comfort level 126 of the user with the current level of rendered virtual objects in the field of view; and a difficulty level adjuster 128 to modify a user difficult level based on the comfort level 126 to produce a modified difficulty level 130 to provide to the driving simulator client 114 to include in the next sent instance of user view information 200 sent to the driving simulator server 100.

In one embodiment, the mixed reality display 106 may comprise a type of computer vision glasses to render mixed reality virtual objects. The mixed reality display 106 may further comprise a gaze tracking device to receive a gazed virtual object detected by eye tracking cameras that acquire the gazed virtual object on which the tracked eye is fixed and information on coordinates of an axis of a line-of-sight, also referred to as sightline, visual axis, the user is viewing within the field of vision captured by the gaze tracking device tracking. Mixed reality (MR) smart glasses are wearable computer-capable glasses that generate virtual objects, such as three-dimensional images, text, animations, and videos, to overlay into the wearer's field of vision so the digital information is viewable along with real world scenes in the wearer's field of vision. The display 106 may further provide augmented reality (AR) virtual objects. Augmented reality is used to supplement information presented to users on items they are looking at, such as augmented reality controls to control items in the wearer's field of vision or information on locations in the field of vision. Additionally, the mixed reality glasses 106 may provide mixed reality virtual objects that interact with the real world. For instance, a mixed reality virtual object may react to you in the same way as it would in the real world, such as move closer to the user as the user moves closer to the virtual object.

The mixed reality glasses 106 include a processor, display, sensors and input devices, and may include many of the components found in smartphones and tablet computers. Mixed reality rendering may be performed by optical projection systems, monitors, handheld devices, and display systems worn on the human body. A head-mounted display (HMD) is a display device worn on the forehead, such as a harness or helmet-mounted. HMDs place images of both the physical world and virtual objects over the user's field of view. Modern HMDs often employ sensors for six degrees of freedom monitoring that allow the system to align virtual information to the physical world and adjust accordingly with the user's head movements. The HMDs may also implement gesture controls for full virtual immersion.

Augmented and mixed reality displays may be rendered on devices resembling eyeglasses, and employ cameras to intercept real world view and re-display its augmented view through the eye pieces and devices in which MR imagery is projected through or reflected off the surfaces of the eyewear lens places. Other implementations of MR displays include a head-up display (HUD), which is a transparent display that presents data without requiring users to look away from their usual viewpoints. Mixed reality may include overlaying the information and registration and tracking between the superimposed perceptions, sensations, information, data, and images and some portion of the real world. Additional mixed reality implementations include contact lenses and virtual retinal display, where a display is scanned directly into the retina of a viewer's eye. EyeTap augmented reality devices capture rays of light that would otherwise pass through the center of the lens of the wearer's eye, and substitutes synthetic computer-controlled light for each ray of real light. The mixed reality display 106 may further use motion tracking technologies, including digital cameras and/or other optical sensors, accelerometers, GPS, gyroscopes, solid state compasses, radio-frequency identification (RFID).

The term "mixed reality" as used herein may refer to augmented reality, mixed reality, and virtual reality environments and uses.

Figure 2:
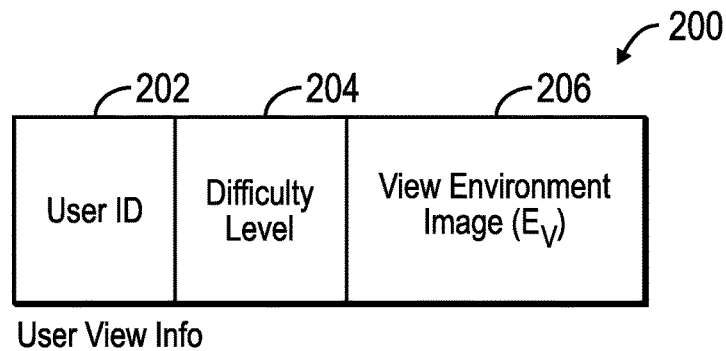
FIG. 2 illustrates an embodiment of user view information to use to generate virtual objects in the user view.

The driving simulator server 100 includes a deployed generator neural network 132 and training process 300, described with respect to FIG. The deployed generator neural network 132 includes a simulation manager 134 to receive the user view information 200 from the driving simulator client 114. The user view information 200, as described with respect to FIG. 2, includes a user identifier (ID) 202 of the user operating the vehicle for which the virtual objects will be generated into their field of view, such as obstacles, additional traffic, etc., a difficulty level 204, which may be modified by the difficulty level adjuster 128, and the view environment image 206, still image or video, captured by the dash cam 110. Alternatively the view environment image 206 may be captured by a camera in the mixed reality display 106.

The simulation manager 134 inputs the view environment image 206 and the user difficulty level 204 from the user view information 200 along with random input 136 into the generator 138 to output an augmented environment image 139 having generated virtual objects 140 added to the view environment image 206 to create further obstacles in the user field of view. These additional virtual objects may form obstacles in the user field of view to test and train the user how to avoid additional obstacles while operating the vehicle in an environment not having such challenging obstacles, such as an empty parking lot, light traffic, open highway, etc. The virtual objects 140 added to the augmented environment image 139 may indicate the object/image to add and a location in the user field of view at which the virtual object 140 should be rendered. The generated virtual objects 140 are transmitted to the driving simulator client 114 to forward to the mixed reality generator 115, which transmits the virtual objects 140 to the mixed reality display 106 to render in the user field of view. The virtual objects 140 may comprise traffic objects specific to the vehicle the user is operating, such as road traffic if the user is operating an automobile, motorcycle, scooter, etc., boating traffic if the vehicle is a boat, or air traffic if the user is operating an airplane.

In one embodiment, the generator 138 may comprise a generator component of an object-centric Generative Adversarial Network (OC-GAN). The generator 138 may implement specific machine learning components, such as convolutional networks, to process the view environment image 206, generate a scene layout, and then additional convolutional neural network (CNN) components to generate the virtual objects 140 or images into the scene of the view environment image 206. Further, the GAN implementing the generator 138 and discriminator 312 may comprise a conditional GAN, where a user difficulty level 204 comprises an additional conditional input to the generator 138 to control the level of difficulty of the virtual objects 140 outputted by the generator 138. The random input 136 may comprise prior input noise, such as Gaussian noise combined with prior output.

In one embodiment the comfort level generator 124 may be implemented as a Region-Convolutional Neural Network (R-CNN) algorithm to raster scan the user's environment and create a correlation matrix indicating a user comfort level, which is proportional to the function of readings from the biometric tracker 108 and the performance score 122 indicating the user ability to clear object obstacles without losing confidence.

Figure 3:
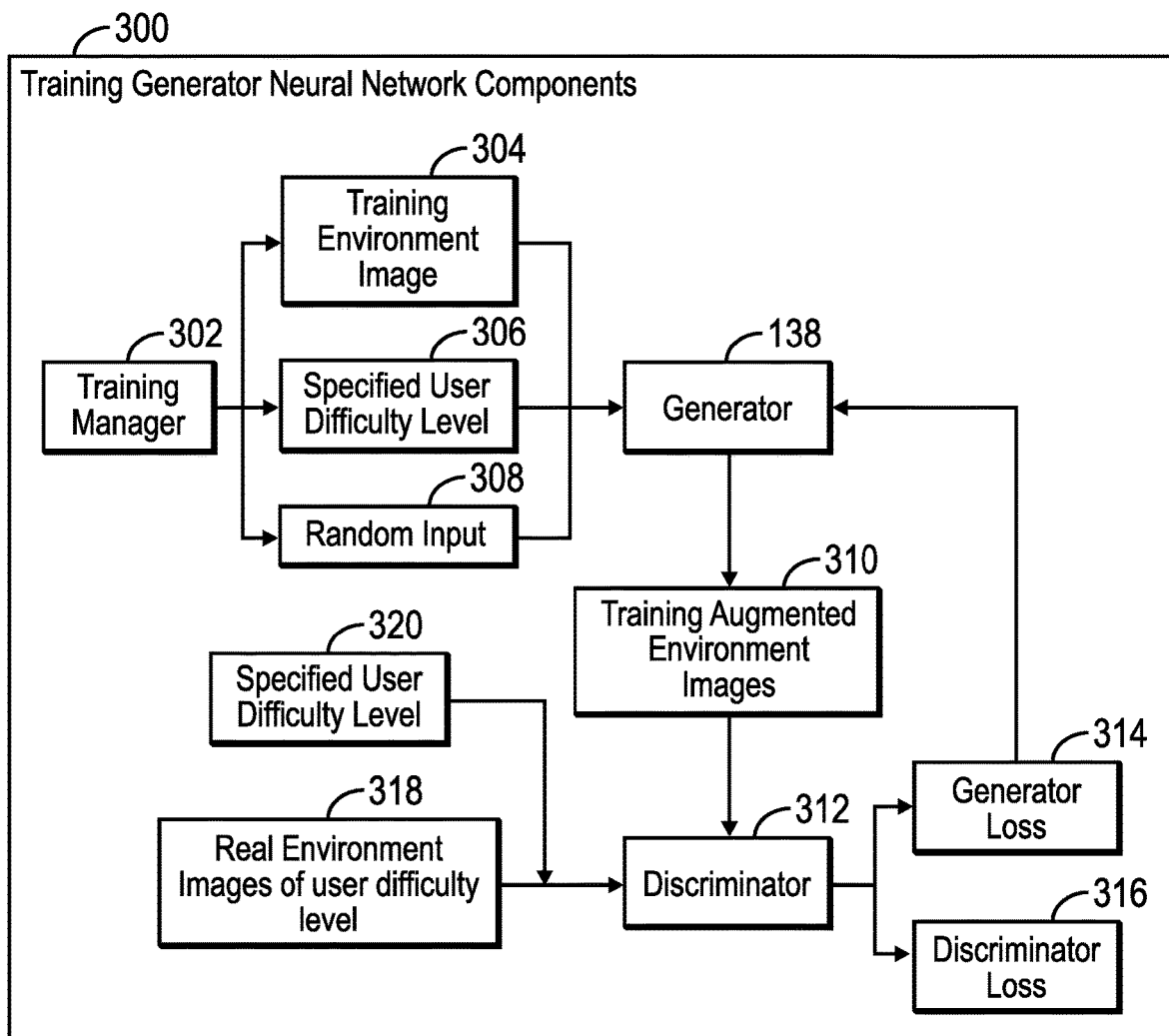
FIG. 3 illustrates an embodiment of training generator neural network components in the driving simulation server to train the neural network components to generate realistic depictions of virtual objects in a view environment image of the view of the user when operating the vehicle.

The training process 300, as shown in FIG. 3, includes a training manager 302 to manage the training process. The training manager 302 may input training environment images 304 having a specified user difficulty 306 along with random input 308 to the generator 138, same as generator 138 in the Deployed GAN 132 in FIG. 1, to generate training augmented environment images 310, having added virtual objects or images in the domain of traffic the user operating the vehicle would experience. The training augmented environment images 310 may then be inputted to a discriminator neural network 312 along with the specified user difficulty level 306 to classify as real, such as from a photo, or fake from the generator 138. If a training augmented environment images 308 is classified as fake, then that is a generator loss 314 because the generator 138 was unable to generate an image that would trick the discriminator 312 into classifying the training augmented environment image 310 as real. This generator loss 314 would trigger the generator 138 to retrain and adjust its weights and parameters to output the training augmented environment image 310, classified as fake, with a low confidence level.

If the training augmented environment image 310 is classified as real, then that is a discriminator loss 316 because the discriminator 312 was unable to discern the training augmented environment image 310 as fake from the generator 138. This discriminator loss 316 would trigger the discriminator 312 to retrain and adjust its weights and parameters to output the training augmented environment image 310 as fake with a low confidence level or probability.

The training manager 302 may further train the discriminator 312 to classify real environment images 318 of a specified user difficulty level 320 as real with a high confidence level.

The network 104 may comprise a network such as a Storage Area Network (SAN), Local Area Network (LAN), Intranet, the Internet, Wide Area Network (WAN), peer-to-peer network, wireless network, arbitrated loop network, etc.

The arrows shown in FIGS. 1 and 3 between the components and objects in the user computing device 102 and driving simulation server 100 represent a data flow between the components.

In certain embodiments, the performance monitor 120, comfort level generator 124, difficulty level adjuster 128, generator 138, and discriminator 312 may use machine learning and deep learning algorithms, such as decision tree learning, association rule learning, neural network, inductive programming logic, support vector machines, Bayesian network, etc. For artificial neural network program implementations of these components, the neural network may be trained using backward propagation to adjust weights and biases at nodes in a hidden layer to produce their output based on the received inputs. In backward propagation used to train a neural network machine learning module, biases at nodes in the hidden layer are adjusted accordingly to produce the output, such as a comfort level 126 produced by the comfort level generator 124, a modified user difficulty level 130 produced by the difficulty level adjuster 128, the augmented environment image 139 and generated virtual objects 140 produced by the generator 138, and the classification of an input image as fake or real by the discriminator 312. Backward propagation may comprise an algorithm for supervised learning of artificial neural networks using gradient descent. Given an artificial neural network and an error function, the method may use gradient descent to find the parameters (coefficients) for the nodes in a neural network or function that minimizes a cost function measuring the difference or error between actual and predicted values for different parameters. The parameters are continually adjusted during gradient descent to minimize the error.

In backward propagation used to train a neural network machine learning module, such as 124, 128, 138, 312, margin of errors are determined based on a difference of the calculated predictions and user rankings of the output. Biases (parameters) at nodes in the hidden layer are adjusted accordingly to minimize the margin of error of the error function.

In an alternative embodiment, the comfort level generator 124 or difficulty level adjuster 128 may be implemented not as a machine learning module, but implemented using a rules based system to determine the outputs from the inputs. As noted, the generator 138 and the discriminator 312 may be part of an object centric GAN.

Generally, program modules, such as the program components 114, 115, 116, 120, 124, 128, 134, 138, 302, 312 may comprise routines, programs, objects, components, logic, data structures, and so on that perform particular tasks or implement particular abstract data types. The program components and hardware devices of the systems 100 and 102 of FIGS. 1 and 3 may be implemented in one or more computer systems, where if they are implemented in multiple computer systems, then the computer systems may communicate over a network.

The program components 114, 115, 116, 120, 124, 128, 134, 138, 302, 312 may be accessed by a processor from memory to execute. Alternatively, some or all of the program components 114, 115, 116, 120, 124, 128, 134, 138, 302, 312 may be implemented in separate hardware devices, such as Application Specific Integrated Circuit (ASIC) hardware devices.

The functions described as performed by the program 114, 115, 116, 120, 124, 128, 134, 138, 302, 312 may be implemented as program code in fewer program modules than shown or implemented as program code throughout a greater number of program modules than shown.

The program components described as implemented in the server 100 may be implemented in the user computing device 102.

The user computing device 102 may comprise a personal computing device, such as a laptop, desktop computer, tablet, smartphone, wearable computer, etc. The server 100 may comprise one or more server class computing devices, or other suitable computing devices. Alternatively, the components of the driving simulation server 100 and user computing device training 102 may be embedded in the mixed reality display 106.

Figure 4:
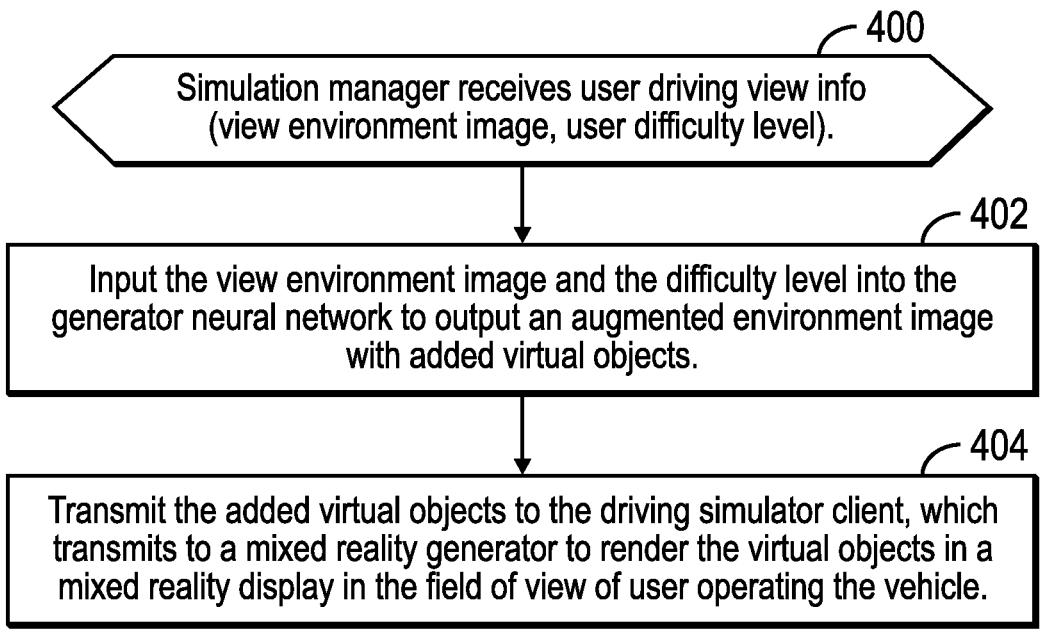
FIG. 4 illustrates an embodiment of a generator producing realistic virtual objects to render in a user field of view while operating a vehicle.

FIG. 4 illustrates an embodiment of operations performed by components in the deployed generator 138, trained as part of the training process 300, to generate virtual objects 140 for a traffic environment in which the user is operating a vehicle. Upon the simulation manager 134 receiving (at block 400) user view information 200 from the driving simulator client 114, the simulation manager 134 inputs (at block 402) the view environment image 206, as captured by one or more dashboard cameras 110, and the difficulty level 204 of the user into the generator 138 to output an augmented environment image 139 including added virtual objects 140. The added virtual objects 140 may be outputted by the generator 138 or extracted from the augmented environment image 139 by object detection software. The simulation manager 134 transmits (at block 404) the added virtual objects 140 to the driving simulator client 114, which transmits the objects 140 to a mixed reality generator 115 to render the virtual objects in a mixed reality display 106 in the field of view of user operating the vehicle.

With the embodiment of FIG. 4, the generator 138 may generate virtual objects in a domain specific to the environment in which the user is operating a vehicle to render in the user field of view to provide obstacles to help train the user for different vehicle operating environments. The level or difficulty at which virtual objects are rendered is based on a predetermined user difficulty level, so that obstacles are generated at a level slightly challenging for the user. The driving simulator client 114 may have the capability to terminate the rendering of the virtual objects if the actual driving environment, such as surrounding cars and conditions, would be unsafe for rendering virtual images to further challenge the user operating the vehicle.

With described embodiments, the generated augmented environment images 139 may comprise frames of a frame buffer to form a video or continues view of the field of view, to allow for adjustment and change of the virtual objects rendered in the view based on the user traversing through a view to a new view.

Figure 5:
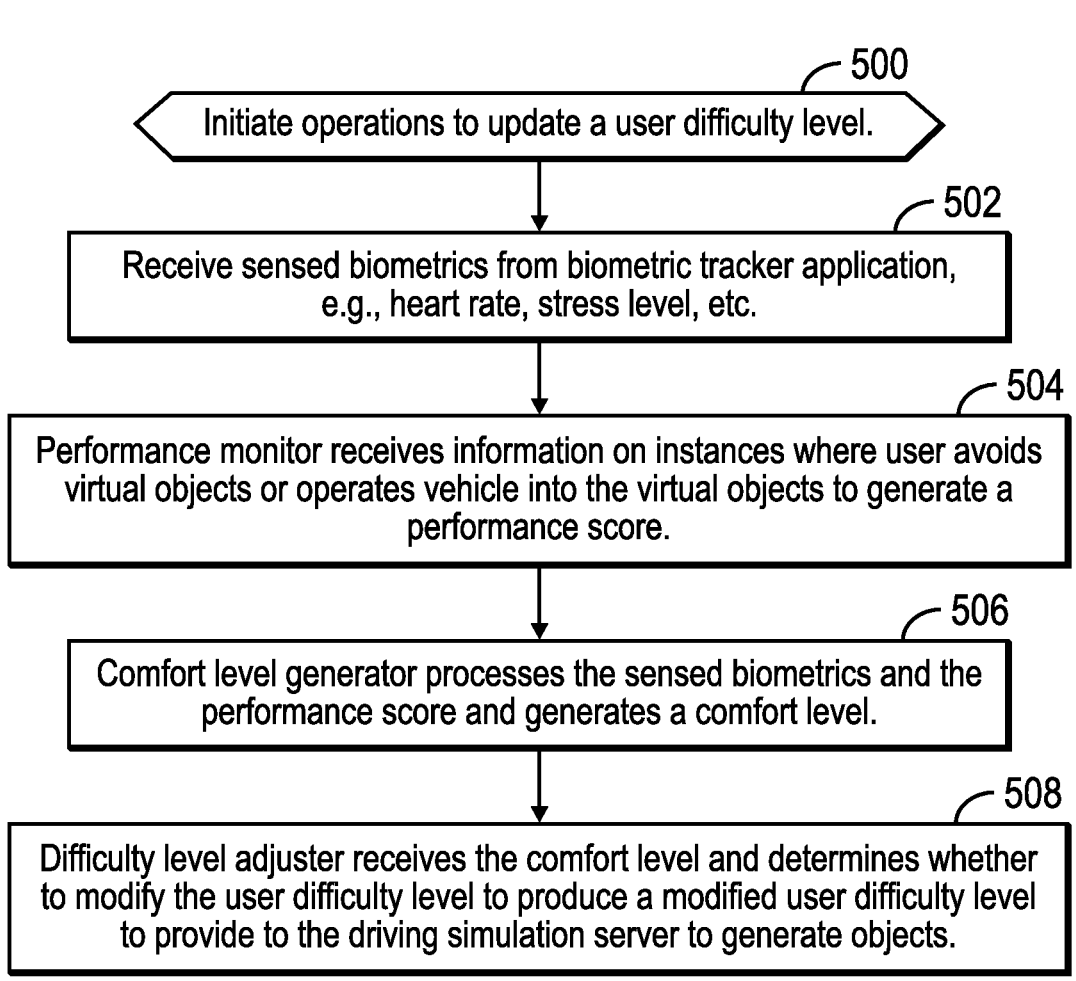
FIG. 5 illustrates an embodiment of operations to determine whether to adjust a user difficulty level used to determine the virtual objects to render in the user field of view.

FIG. 5 illustrates an embodiment of operations performed by the comfort level generator 124, difficulty level adjuster 128 and other components to update the user difficulty level 130 used to determine the level of difficulty of the generated virtual objects in the field of view of the user while operating the vehicle. Upon initiating (at block 500) operation to update a user difficulty level, the comfort level generator 124 receives (at block 502) sensed biometrics 118 from a biometric tracker 108 worn by the user while operating the vehicle and having virtual objects 140 rendered in the user field of view. The sensed biometrics 118, such as heart rate, stress level, etc. from the biometric tracker 108, may indicate an extent to which a user is stressed with the current vehicle operating environment. The performance monitor 120 receives (at block 504) information on instances where the user operates the vehicle to successfully avoid virtual objects or is unsuccessful in navigating the virtual objects to generate a performance score 122.

The comfort level generator 124 receives the sensed biometrics 118 and the performance score 122 and generates (at block 506) a comfort level 126 measuring user stress in navigating the virtual objects and the success of the user in avoiding the virtual objects 140. The difficulty level adjuster 128 receives the comfort level 126 and determines (at block 508) whether to modify the user difficulty level to produce a modified user difficulty level to provide to the driving simulation server 100 to generate objects. For instance, if the comfort level 126 indicates the user is relatively comfortable operating in the current environment with current level of virtual objects, i.e., has sensed biometrics 118 indicating low stress and a high performance score 122, then the difficulty level adjuster 128 may increase the difficulty level 130 to generate more virtual objects 140 into the user field of view to provide additional obstacle challenges. Likewise, if the comfort level 126 indicates the user is uncomfortable operating in the current environment with current level of virtual objects, i.e., has sensed biometrics 118 indicating high stress and a low performance score 122, then the difficulty level adjuster 128 may reduce the difficulty level 130 to generate fewer virtual objects 140 into the user field of view to provide fewer obstacle challenges. In this way, the rendering of virtual objects may be tailored specifically to the user's capabilities and comfort level in handling the challenges of the virtual objects comprising virtual obstacles.

The user difficulty level may be modified within a training session to change the level of virtual objects generated or may be calculated when a session ends based on gathered data to modify the user difficulty level for further sessions.

Figure 6:
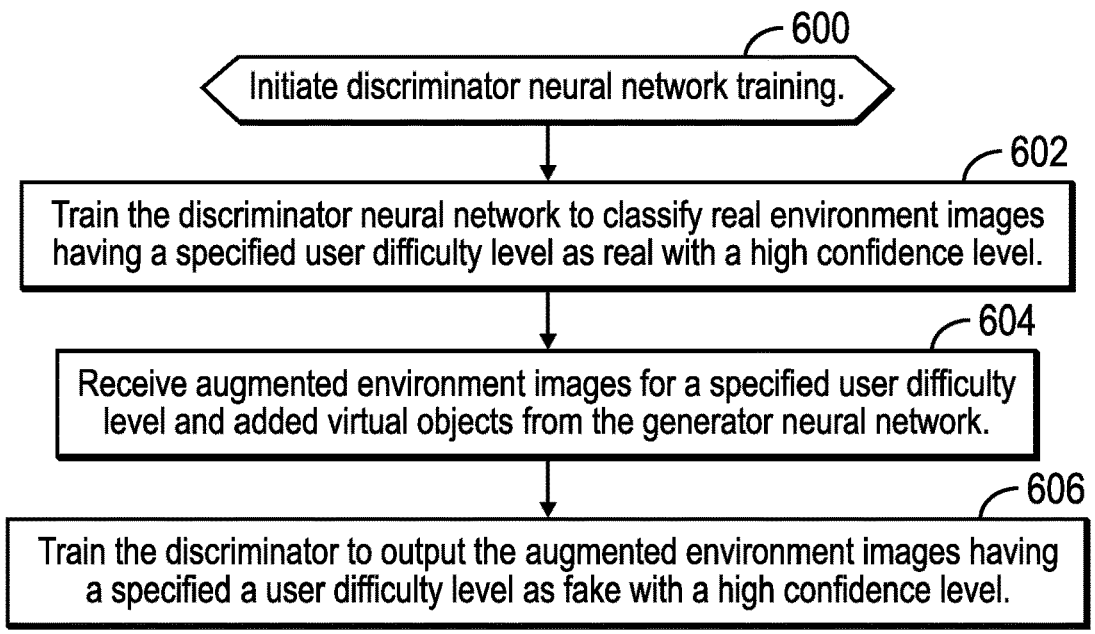
FIG. 6 illustrates an embodiment of operations to train a discriminator neural network in a conditional Generative Adversarial Network (GAN).

FIG. 6 illustrates an embodiment of operations performed by the training manager 302 and the discriminator 312 to train the discriminator 312 to improve its ability to detect fake images generated by the generator 138, and real images of actual traffic environments. Upon initiating (at block 600) training of the discriminator 312, the discriminator 312 is trained (at block 602) to classify real environment images 318 having a specified a user difficulty level 320 as real with a high confidence level. The discriminator 312 may further receive (at block 604) training augmented environment images 310, produced by the generator 138, for a specified user difficulty level and having added virtual objects. The training manager 302 may train (at block 606) the discriminator 312 to output the training augmented environment images 310 having a specified a user difficulty level as fake, i.e., generated by a generator, with a high confidence level.

Figure 7:
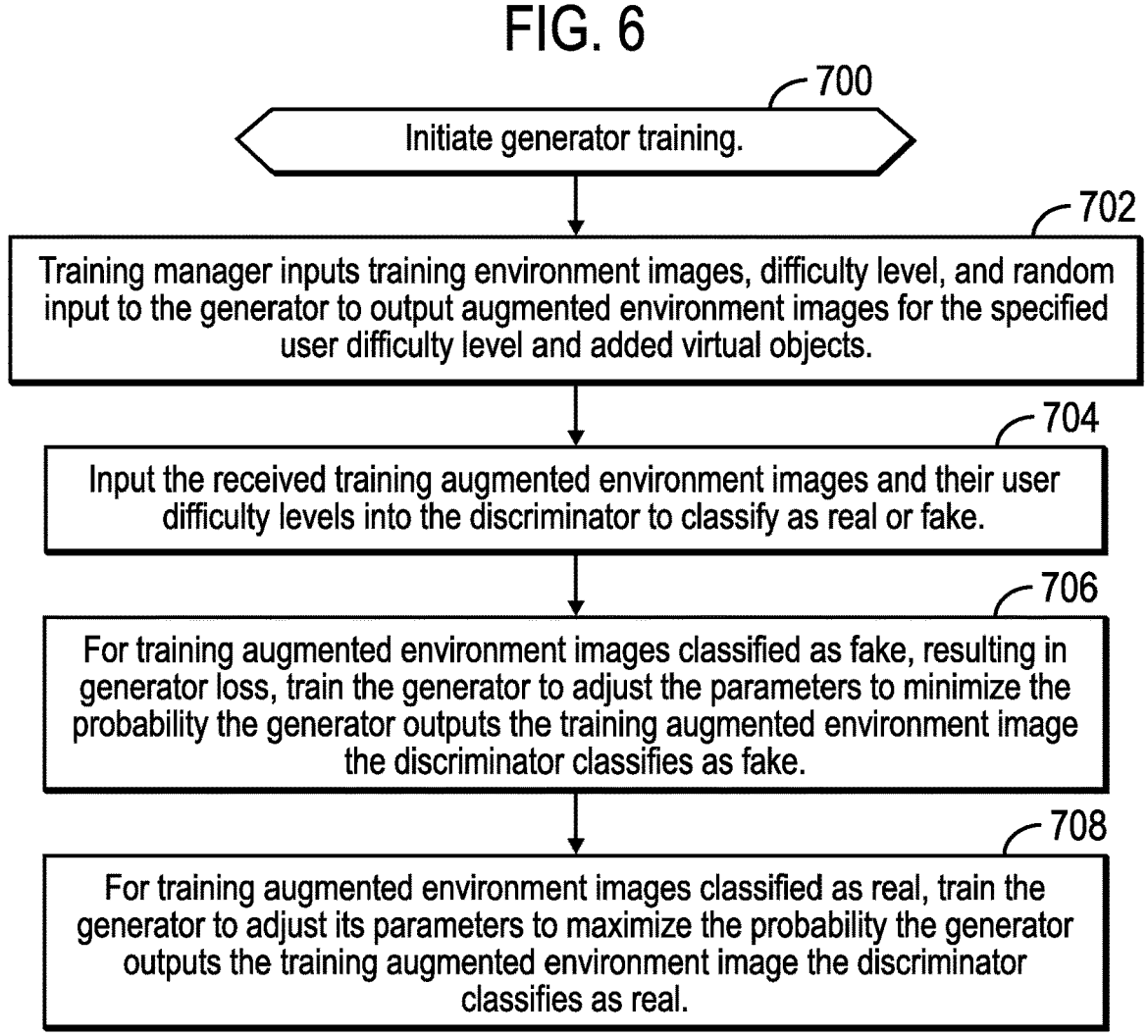
FIG. 7 illustrates an embodiment of operations to train a generator neural network to output realistic augmented environment images of traffic views in a conditional GAN.

FIG. 7 illustrates an embodiment of operations performed by the training manager 302, the generator 138, and the discriminator 312 to train the generator 138 to improve its ability to generate virtual objects into a traffic scene. Upon initiating (at block 700) generator training, the training manager 302 inputs (at block 702) training environment images 304, difficulty levels 306, and random inputs 308 to the generator 138 to output training augmented environment images 310 for the specified user difficulty level having added virtual objects. The training manager 302 inputs (at block 704) the training augmented environment images 310 and the user difficulty levels into the discriminator 312 to classify as real or fake.

For training augmented environment images classified as fake, resulting in generator loss 314, the training manager 302 trains (at block 706) the generator 138 to adjust parameters to minimize the probability the generator 138 outputs the training augmented environment image 310 the discriminator classifies as fake. For training augmented environment images 310 classified as real, the training manager 302 trains (at block 708) the generator 138 to adjust its parameters to maximize the probability the generator 138 outputs the training augmented environment image 310 the discriminator 312 classifies as real.

With the above embodiment, backpropagation to adjust the weights and biases of the generator 138 and discriminator 312 starts with the classification from the discriminator 312 and then flows back to train the discriminator 312 and then the generator 138 based on the discriminator 312 classification as real or fake. In this way, two separate neural networks 138, 312 are trained. In certain embodiments, the generator 138 may not be trained during the discriminator 312 training phase. Instead, the classifications by the discriminator 312 would be maintained in a training set to train the generator 138. Such a training set maintains the inputs 304, 306, 308 used by the generator 138 to output the training augmented environment images 310 along with the classification which instructs the generator 138 to train to process the inputs 304, 306, 308 to output the previously generated training augmented environment images 310 with high (e.g., above 90%) or low (e.g., below 50%) probability based on whether the classification of the training augmented environment images 310 is real or fake, respectively.

In described embodiments, the virtual objects are rendered in the field of view the user is observing. In alternative embodiments, the augmented environment images may form frames of a video to provide an entirely virtual reality (VR) environment, where the moving frames provide the entire traffic environment in situations the user is using simulator controls, such as a full vehicle simulator.

The present invention may be a system, a method, and/or a computer program product. The computer program product may include a computer readable storage medium (or media) having computer readable program instructions thereon for causing a processor to carry out aspects of the present invention.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 800 contains an example of an environment for the execution of at least some of the computer code 801 involved in performing the inventive methods, such as driving server simulation components 845, including 134, 138, 302, 312 in FIGS. 1 and 3, and user device simulation components 846, including 114, 115, 116, 120, 124, 128 in FIG. 1.

In addition to block 801, computing environment 800 includes, for example, computer 801, wide area network (WAN) 802, end user device (EUD) 803, remote server 804, public cloud 805, and private cloud 806. In this embodiment, computer 801 includes processor set 810 (including processing circuitry 820 and cache 821), communication fabric 811, volatile memory 812, persistent storage 813 (including operating system 822 and block 801, as identified above), peripheral device set 814 (including user interface (UI) device set 823, storage 824, and Internet of Things (IoT) sensor set 825), and network module 815. Remote server 804 includes remote database 830. Public cloud 805 includes gateway 840, cloud orchestration module 841, host physical machine set 842, virtual machine set 843, and container set 844.

Figure 8:
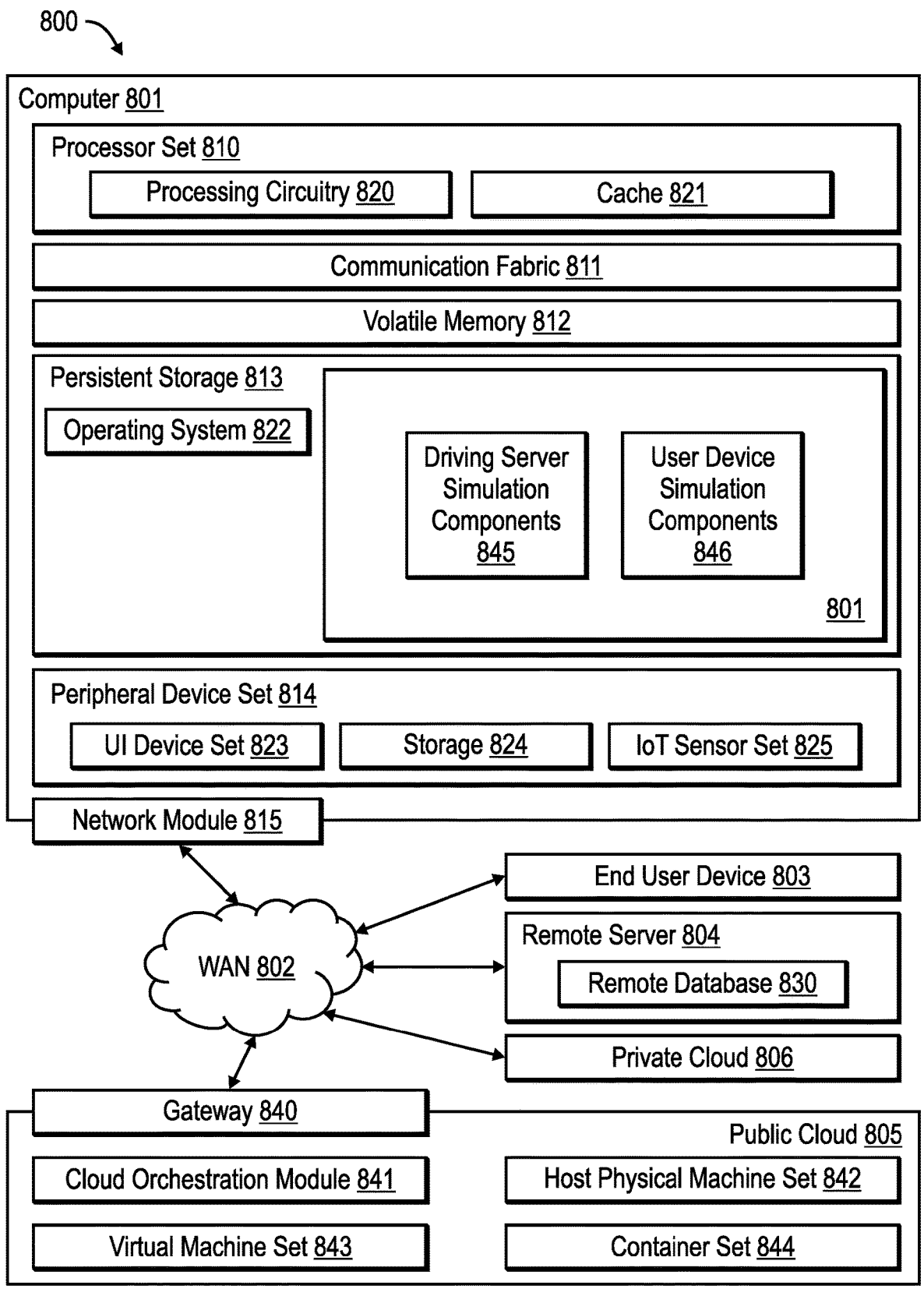
FIG. 8 illustrates a computing environment in which the components of FIG. 1 may be implemented.

COMPUTER 801 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 830. As is well understood in the art of computer technology, and depending upon the technology, performance of a computer-implemented method may be distributed among multiple computers and/or between multiple locations. On the other hand, in this presentation of computing environment 800, detailed discussion is focused on a single computer, specifically computer 801, to keep the presentation as simple as possible. Computer 801 may be located in a cloud, even though it is not shown in a cloud in FIG. 8. On the other hand, computer 801 is not required to be in a cloud except to any extent as may be affirmatively indicated.

PROCESSOR SET 810 includes one, or more, computer processors of any type now known or to be developed in the future. Processing circuitry 820 may be distributed over multiple packages, for example, multiple, coordinated integrated circuit chips. Processing circuitry 820 may implement multiple processor threads and/or multiple processor cores. Cache 821 is memory that is located in the processor chip package(s) and is typically used for data or code that should be available for rapid access by the threads or cores running on processor set 810. Cache memories are typically organized into multiple levels depending upon relative proximity to the processing circuitry. Alternatively, some, or all, of the cache for the processor set may be located "off chip." In some computing environments, processor set 810 may be designed for working with qubits and performing quantum computing.

Computer readable program instructions are typically loaded onto computer 801 to cause a series of operational steps to be performed by processor set 810 of computer 801 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 821 and the other storage media discussed below. The program instructions, and associated data, are accessed by processor set 810 to control and direct performance of the inventive methods. In computing environment 800, at least some of the instructions for performing the inventive methods may be stored in persistent storage 813.

COMMUNICATION FABRIC 811 is the signal conduction path that allows the various components of computer 801 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 812 is any type of volatile memory now known or to be developed in the future. Examples include dynamic type random access memory (RAM) or static type RAM. Typically, volatile memory 812 is characterized by random access, but this is not required unless affirmatively indicated. In computer 801, the volatile memory 812 is located in a single package and is internal to computer 801, but, alternatively or additionally, the volatile memory may be distributed over multiple packages and/or located externally with respect to computer 801.

PERSISTENT STORAGE 813 is any form of non-volatile storage for computers that is now known or to be developed in the future. The non-volatility of this storage means that the stored data is maintained regardless of whether power is being supplied to computer 801 and/or directly to persistent storage 813. Persistent storage 813 may be a read only memory (ROM), but typically at least a portion of the persistent storage allows writing of data, deletion of data and re-writing of data. Some familiar forms of persistent storage include magnetic disks and solid state storage devices. Operating system 822 may take several forms, such as various known proprietary operating systems or open source Portable Operating System Interface-type operating systems that employ a kernel. The code included in block 801 typically includes at least some of the computer code involved in performing the inventive methods.

PERIPHERAL DEVICE SET 814 includes the set of peripheral devices of computer 801. Data communication connections between the peripheral devices and the other components of computer 801 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 823 may include components such as a display screen, speaker, microphone, wearable devices (such as goggles and smart watches), keyboard, mouse, printer, touchpad, game controllers, and haptic devices. Storage 824 is external storage, such as an external hard drive, or insertable storage, such as an SD card. Storage 824 may be persistent and/or volatile. In some embodiments, storage 824 may take the form of a quantum computing storage device for storing data in the form of qubits. In embodiments where computer 801 is required to have a large amount of storage (for example, where computer 801 locally stores and manages a large database) then this storage may be provided by peripheral storage devices designed for storing very large amounts of data, such as a storage area network (SAN) that is shared by multiple, geographically distributed computers. IoT sensor set 825 is made up of sensors that can be used in Internet of Things applications. For example, one sensor may be a thermometer and another sensor may be a motion detector.

NETWORK MODULE 815 is the collection of computer software, hardware, and firmware that allows computer 801 to communicate with other computers through WAN 802. Network module 815 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 815 are performed on the same physical hardware device. In other embodiments (for example, embodiments that utilize software-defined networking (SDN)), the control functions and the forwarding functions of network module 815 are performed on physically separate devices, such that the control functions manage several different network hardware devices. Computer readable program instructions for performing the inventive methods can typically be downloaded to computer 801 from an external computer or external storage device through a network adapter card or network interface included in network module 815.

WAN 802 is any wide area network (for example, the internet) capable of communicating computer data over non-local distances by any technology for communicating computer data, now known or to be developed in the future. In some embodiments, the WAN 802 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 803 is any computer system that is used and controlled by an end user (for example, a customer of an enterprise that operates computer 801), and may take any of the forms discussed above in connection with computer 801. EUD 803 typically receives helpful and useful data from the operations of computer 801. For example, in a hypothetical case where computer 801 is designed to provide a recommendation to an end user, this recommendation would typically be communicated from network module 815 of computer 801 through WAN 802 to EUD 803. In this way, EUD 803 can display, or otherwise present, the recommendation to an end user. In some embodiments, EUD 803 may be a client device, such as thin client, heavy client, mainframe computer, desktop computer and so on.

REMOTE SERVER 804 is any computer system that serves at least some data and/or functionality to computer 801. Remote server 804 may be controlled and used by the same entity that operates computer 801. Remote server 804 represents the machine(s) that collect and store helpful and useful data for use by other computers, such as computer 801. For example, in a hypothetical case where computer 801 is designed and programmed to provide a recommendation based on historical data, then this historical data may be provided to computer 801 from remote database 830 of remote server 804.

PUBLIC CLOUD 805 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 805 is performed by the computer hardware and/or software of cloud orchestration module 841. The computing resources provided by public cloud 805 are typically implemented by virtual computing environments that run on various computers making up the computers of host physical machine set 842, which is the universe of physical computers in and/or available to public cloud 805. The virtual computing environments (VCEs) typically take the form of virtual machines from virtual machine set 843 and/or containers from container set 844. It is understood that these VCEs may be stored as images and may be transferred among and between the various physical machine hosts, either as images or after instantiation of the VCE. Cloud orchestration module 841 manages the transfer and storage of images, deploys new instantiations of VCEs and manages active instantiations of VCE deployments. Gateway 840 is the collection of computer software, hardware, and firmware that allows public cloud 805 to communicate through WAN 802.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 906 is similar to public cloud 905, except that the computing resources are only available for use by a single enterprise. While private cloud 906 is depicted as being in communication with WAN 902, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 905 and private cloud 906 are both part of a larger hybrid cloud.

The letter designators, such as i, is used to designate a number of instances of an element may indicate a variable number of instances of that element when used with the same or different elements.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A computer program product for generating an augmented environment for a user while operating a vehicle, the computer program product comprising a computer readable storage medium having computer readable program code embodied therein that is executable to perform operations, the operations comprising:

receiving a view environment image of a user field of view of a user operating the vehicle;

inputting the view environment image and a user difficulty level for the user into a generator, comprising a neural network model, to generate an augmented environment image including virtual objects added to the view environment image; and transmitting the virtual objects to a mixed reality display to render in the user field of view;

receiving information, including user biometrics, gathered during the user operating the vehicle to avoid the virtual objects rendered in the user field of view;

modifying the user difficulty level to produce a modified user difficulty level based on the received information; and inputting the modified user difficulty level to the generator to generate a further augmented environment image with added virtual objects to transmit to the mixed reality display to further render in the user field of view.

2. The computer program product of claim 1, wherein the operations further comprise:
inputting a specified user difficulty level and training environment images into the generator to output training augmented environment images including added virtual objects;
determining whether the training augmented environment images and the added virtual objects are fake or real;
training the generator to output a training augmented environment image with added virtual objects with a low confidence level in response to determining the training augmented environment image is fake; and
training the generator to output the training augmented environment image with the added virtual objects with a high confidence level in response to determining the training augmented environment images are real.

3. The computer program product of claim 2, wherein a discriminator, comprising a neural network, performs the determining whether the training augmented environment images and the added virtual objects are fake or real, wherein the operations further comprise:
training the discriminator to classify real environment images for a specified user difficulty level as real for the user difficulty level; and
training the discriminator to classify training augmented environment images from the generator for a specified user difficulty level as fake for the user difficulty level.

4. The computer program product of claim 3, wherein the generator and the discriminator are implemented in a Conditional Generative Adversarial Network (GAN).

5. The computer program product of claim 1, wherein the virtual objects are generated based on the user difficulty level for the user operating the vehicle to output the virtual objects to provide when rendered in the user field of view a level of obstacles consistent with the user difficulty level.

6. The computer program product of claim 1, wherein the operations further comprise:
determining a user performance in operating the vehicle to avoid the virtual objects rendered in the user field of view; and
determining a comfort level of the user in operating the vehicle to avoid the virtual objects rendered in the user field of view based on the user biometrics and the user performance, where the user difficulty level is modified to produce the modified user difficulty level based on the comfort level.

7. The computer program product of claim 1, wherein the view environment image is generated by at least one camera affixed to the vehicle the user is operating to capture images in the user field of view while operating the vehicle.

8. The computer program product of claim 1, wherein the virtual objects rendered in the user field of view by the mixed reality display comprise virtual traffic obstacles for the user to avoid while operating the vehicle.

9. A system for generating an augmented environment for a user while operating a vehicle, comprising:
a processor; and
a computer readable storage medium having computer readable program code embodied therein that when executed by the processor performs operations, the operations comprising:
receiving a view environment image of a user field of view of a user operating the vehicle;
inputting the view environment image and a user difficulty level for the user into a generator, comprising a neural network model, to generate an augmented environment image including virtual objects added to the view environment image;
transmitting the virtual objects to a mixed reality display to render in the user field of view;
receiving information, including user biometrics, gathered during the user operating the vehicle to avoid the virtual objects rendered in the user field of view;
modifying the user difficulty level to produce a modified user difficulty level based on the received information; and
inputting the modified user difficulty level to the generator to generate a further augmented environment image with added virtual objects to transmit to the mixed reality display to further render in the user field of view.

10. The system of claim 9, wherein the operations further comprise:
inputting a specified user difficulty level and training environment images into the generator to output training augmented environment images including added virtual objects;
determining whether the training augmented environment images and the added virtual objects are fake or real;
training the generator to output a training augmented environment image with added virtual objects with a low confidence level in response to determining the training augmented environment image is fake; and
training the generator to output the training augmented environment image with the added virtual objects with a high confidence level in response to determining the training augmented environment images are real.

11. The system of claim 10, wherein a discriminator, comprising a neural network, performs the determining whether the training augmented environment images and the added virtual objects are fake or real, wherein the operations further comprise:
training the discriminator to classify real environment images for a specified user difficulty level as real for the user difficulty level; and
training the discriminator to classify training augmented environment images from the generator for a specified user difficulty level as fake for the user difficulty level.

12. The system of claim 9, wherein the virtual objects are generated based on the user difficulty level for the user operating the vehicle to output the virtual objects to provide when rendered in the user field of view a level of obstacles consistent with the user difficulty level.

13. The system of claim 9, wherein the operations further comprise:
determining a user performance in operating the vehicle to avoid the virtual objects rendered in the user field of view; and
determining a comfort level of the user in operating the vehicle to avoid the virtual objects rendered in the user field of view based on the user biometrics and the user performance, wherein the user difficulty level is modified to produce a modified user difficulty level based on the comfort level.

14. The system of claim 9, wherein the virtual objects rendered in the user field of view by the mixed reality display comprise virtual traffic obstacles for the user to avoid while operating the vehicle.

15. A method for generating an augmented environment for a user while operating a vehicle, comprising:
receiving a view environment image of a user field of view of a user operating the vehicle;

inputting the view environment image and a user difficulty level for the user into a generator, comprising a neural network model, to generate an augmented environment image including virtual objects added to the view environment image; and transmitting the virtual objects to a mixed reality display to render in the user field of view;

receiving information, including user biometrics, gathered during the user operating the vehicle to avoid the virtual objects rendered in the user field of view;

modifying the user difficulty level to produce a modified user difficulty level based on the received information; and inputting the modified user difficulty level to the generator to generate a further augmented environment image with added virtual objects to transmit to the mixed reality display to further render in the user field of view.

16. The method of claim 15, further comprising:

inputting a specified user difficulty level and training environment images into the generator to output training augmented environment images including added virtual objects;

determining whether the training augmented environment images and the added virtual objects are fake or real;

training the generator to output a training augmented environment image with added virtual objects with a low confidence level in response to determining the training augmented environment image is fake; and training the generator to output the training augmented environment image with the added virtual objects with a high confidence level in response to determining the training augmented environment images are real.

17. The method of claim 16, wherein a discriminator, comprising a neural network, performs the determining whether the training augmented environment images and the added virtual objects are fake or real, further comprising:

training the discriminator to classify real environment images for a specified user difficulty level as real for the user difficulty level; and training the discriminator to classify training augmented environment images from the generator for a specified user difficulty level as fake for the user difficulty level.

18. The method of claim 15, wherein the virtual objects are generated based on the user difficulty level for the user operating the vehicle to output the virtual objects to provide when rendered in the user field of view a level of obstacles consistent with the user difficulty level.

19. The method of claim 15, further comprising:

determining a user performance in operating the vehicle to avoid the virtual objects rendered in the user field of view; and determining a comfort level of the user in operating the vehicle to avoid the virtual objects rendered in the user field of view based on the user biometrics and the user performance, wherein the user difficulty level is modified to produce a modified user difficulty level based on the comfort level.

20. The method of claim 15, wherein the virtual objects rendered in the user field of view by the mixed reality display comprise virtual traffic obstacles for the user to avoid while operating the vehicle.

* * * * *